(12) United States Patent
Manico et al.

(10) Patent No.: US 6,301,002 B1
(45) Date of Patent: *Oct. 9, 2001

(54) FILM HOLDER

(75) Inventors: Joseph Anthony Manico, Rochester; Jerry Carmen, Spencerport, both of NY (US)

(73) Assignee: Eastman Kodak Company, Rochester, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/172,466

(22) Filed: Dec. 22, 1993

(51) Int. Cl.[7] .................................................. G03B 27/62
(52) U.S. Cl. ............................................................. 355/75
(58) Field of Search ................................................. 355/75

(56) References Cited

U.S. PATENT DOCUMENTS

| 2,252,632 | 8/1941 | Jones . | |
|---|---|---|---|
| 2,487,982 | 11/1949 | Reyniers . | |
| 3,814,518 | 6/1974 | Wichers . | |
| 4,286,869 | * 9/1981 | Kogane et al. | 355/75 |
| 4,601,573 | * 7/1986 | Utsugi | 355/15 |
| 4,629,070 | * 12/1986 | Roberg | 206/455 |
| 4,804,989 | * 2/1989 | Kumanomido | 354/283 |
| 4,866,476 | 9/1989 | Kogane et al. | 355/40 |
| 5,179,409 | * 1/1993 | Kazami et al. | 355/75 |

FOREIGN PATENT DOCUMENTS

| 828021 | 1/1952 | (DE) . |
| 91 06 401.5 | 9/1991 | (DE) . |

* cited by examiner

*Primary Examiner*—Christopher Mahoney
(74) *Attorney, Agent, or Firm*—Frank Pincelli

(57) ABSTRACT

A flexible film holder having a format which is consistent with a first filmstrip size. The film holder comprises a first sheet member and second sheet member which are secured to each other so as to form a longitudinally extended pocket therebetween for receiving and holding a filmstrip having a size smaller than the first filmstrip size.

30 Claims, 4 Drawing Sheets

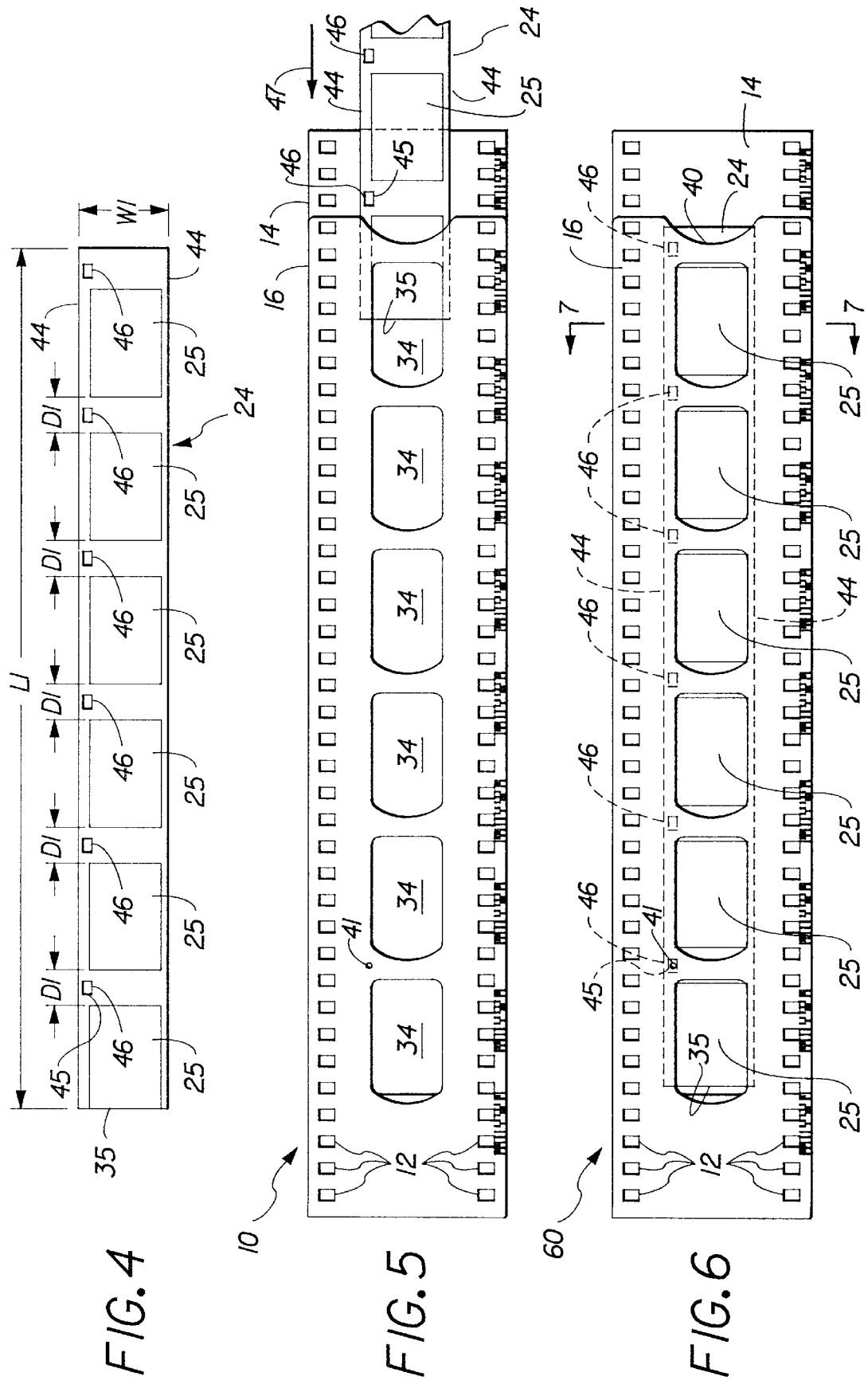

FILM HOLDER

FIELD OF THE INVENTION

The present invention relates to a flexible film holder designed to allow use of a filmstrip of a first size in a printing, processing, or scanning apparatus designed to receive a filmstrip having a size greater than the first size.

BACKGROUND OF THE INVENTION

Certain photographic processing devices, such as processors, printers and film scanners, are dedicated to a particular size film. In particular, many devices are designed to receive 35 mm film negatives. Typically, the negatives are provided in short length strips, i.e. from about 4–8 inches, each having a plurality of images thereon. A typical 35 mm negative filmstrip will have approximately 3–5 images thereon. Film formats smaller than 35 mm, for example, 110 mm or 16 mm film size formats, would not properly fit into the devices designed for use with 35 mm film. In order for these size films to be used in these devices, it would typically be necessary to redesign the film transport mechanism to receive these smaller sizes at substantial cost. Thus, there exists a need to provide means for allowing use of a smaller size film in a device without incurring substantial cost in modifying the device.

It is an object of the present invention to provide a film holder which allows the use of a smaller format filmstrip in a device designed to receive a larger size filmstrip without any modification to the apparatus which is reliable, easy to use, and will not interfere with the normal use and operation of the device.

SUMMARY OF THE INVENTION

A flexible film holder having a format which is consistent with a first filmstrip size. The film holder comprises a first sheet member and second sheet member which are secured to each other so as to form a longitudinally extended pocket therebetween for receiving and holding a filmstrip having a size smaller than the first filmstrip size.

The present invention provides a film holder which is simple in construction, relatively inexpensive, and requires no substantial change or modification to the device in which it is to be used.

DESCRIPTION OF THE DRAWINGS

FIG. 4 is a top plan view of a filmstrip of a size smaller than the film format size of the film holder of FIG. 1;

FIG. 5 is a top plan view similar to FIG. 1 illustrating the insertion of the smaller size filmstrip of FIG. 4 into the film holder of FIG. 1;

FIG. 6 is a top plan view of the film holder of FIG. 1 with the smaller size filmstrip of FIG. 4 completely inserted therein;

DETAILED DESCRIPTION OF THE INVENTION

Figure 1:
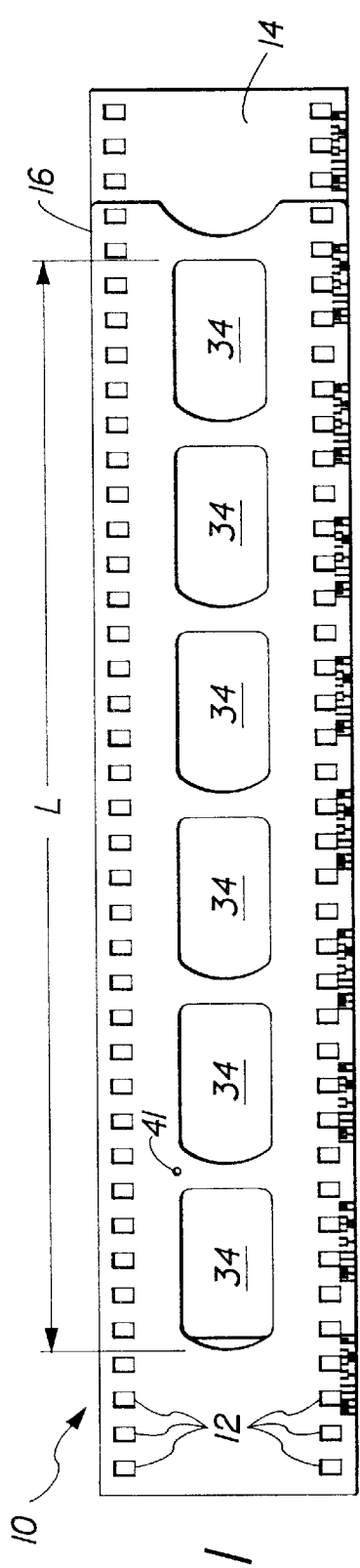
FIG. 1 is a top plan view of a film holder made in accordance with the present invention having a film format of a first size.

Referring to FIGS. 1–7, there is illustrated a filmstrip holder 10 made in accordance with the present invention. The filmstrip holder 10, in the particular embodiment illustrated, is of a 35 mm format and thus has a plurality of perforations 12 along each of the edges which are designed to engage appropriate drive and transport mechanisms used to hold and transport 35 mm size film negatives. An example of such a device is a processor printer sold by the Eastman Kodak company under the trademark CREATE-A-PRINT. The device is designed to receive 35 mm negative filmstrips and allows the user to create copies and/or enlargements of selected images that are available on the 35 mm negative filmstrip.

The filmstrip holder 10 comprises a bottom sheet 14 and a top sheet 16. The top and bottom sheets 14,16 are secured to each other at their lateral edges 18,20, respectively, so as to form a longitudinal receiving pocket 22 having a substantially constant width W and a length L.

Figure 2:
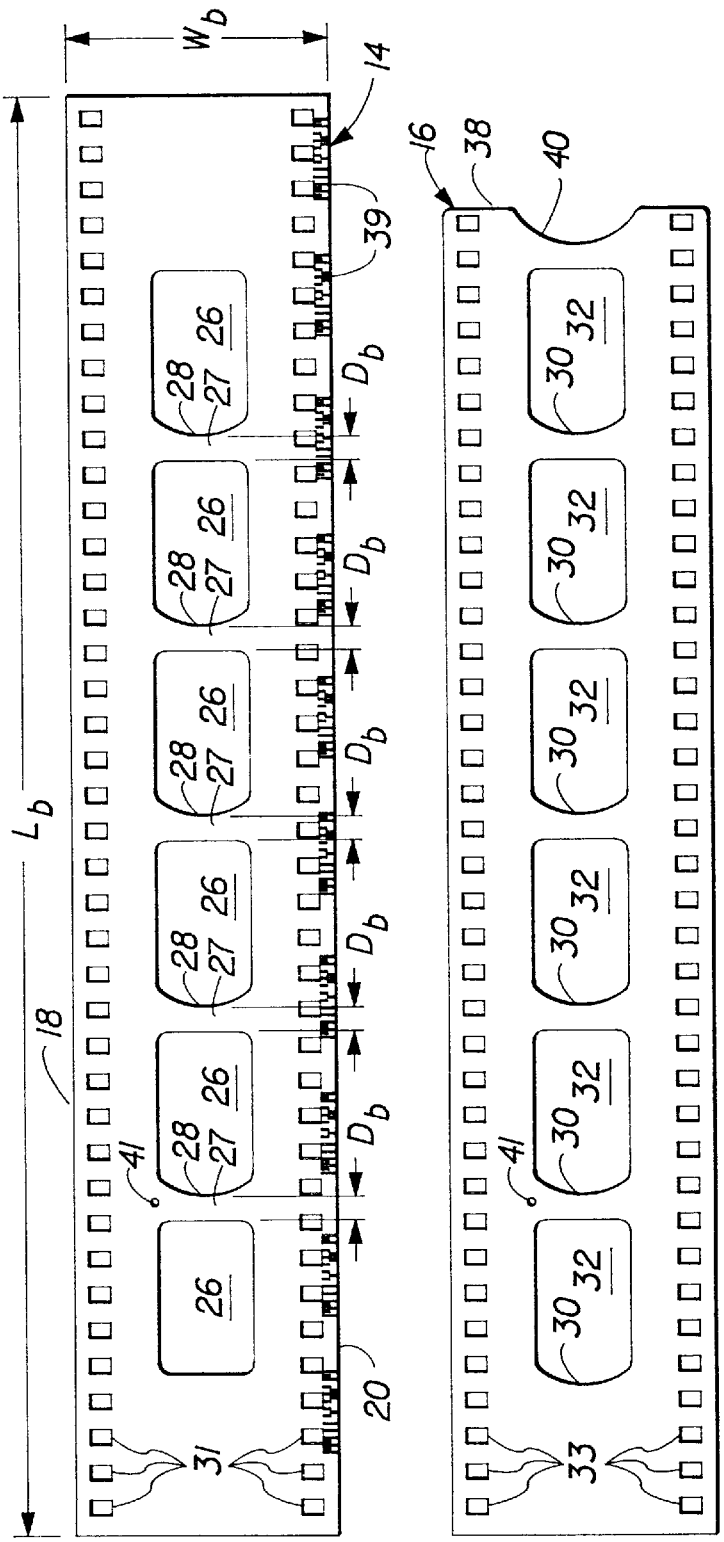
FIG. 2 is a top plan view of the bottom sheet of the film holder of FIG. 1.

Referring to FIG. 2, there is illustrated a top plan view of the bottom sheet of the filmstrip holder 10. In the particular embodiment illustrated, the bottom sheet 14 has a length $L_b$ and a width $W_b$. The width $W_b$ is selected so as to be compatible with 35 mm film negative formats. The length $L_b$ is such so as to accommodate the appropriate length of filmstrip 24 (see FIG. 4) having a format size smaller than that of the format of the holder 10. In the particular embodiment illustrated, the filmstrip 24 has a format size equivalent to that of a 110 film format and has a length L1 and a width W1. In the particular embodiment illustrated, the width W1 is approximately 16 mm and the length L1 is approximately 152 mm.

Referring back to FIG. 2, the bottom sheet 14 is provided with a plurality of openings 26 which are spaced apart a distance $D_b$ and form cross braces 27. The braces 27 assist in providing the appreciate stiffness to the holder. The distance $D_b$ is selected to be equal to or less than the distance D1 between adjacent images on the filmstrip 24. In the particular embodiment illustrated, D1 is approximately 8 mm. The openings 26 each have a leading edge 28 which is preferably curved with respect to the direction of insertion of the filmstrip 24 into the pocket 22. This is done so that the leading end 30 of strip 24 will not stub or catch the leading edge 28 of the openings 26 as the strip is being inserted into pocket 22.

Figure 3:
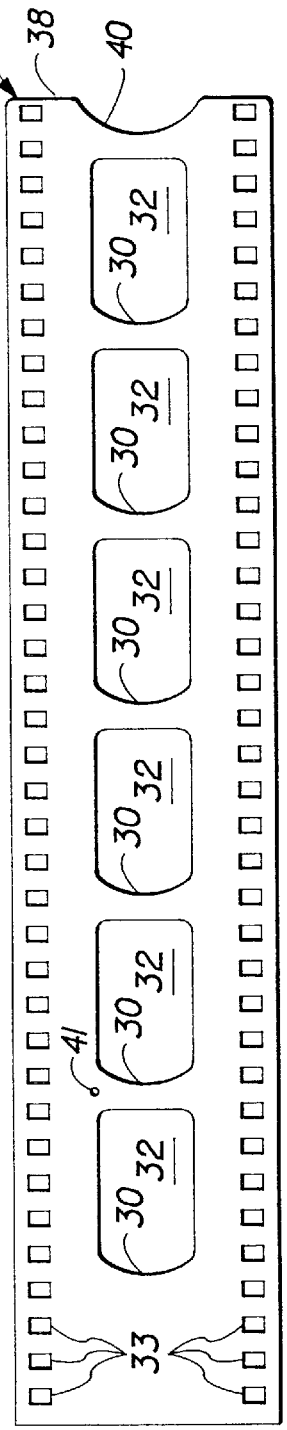
FIG. 3 is a top plan view of the top sheet of the film holder of FIG. 1.
Figure 7:
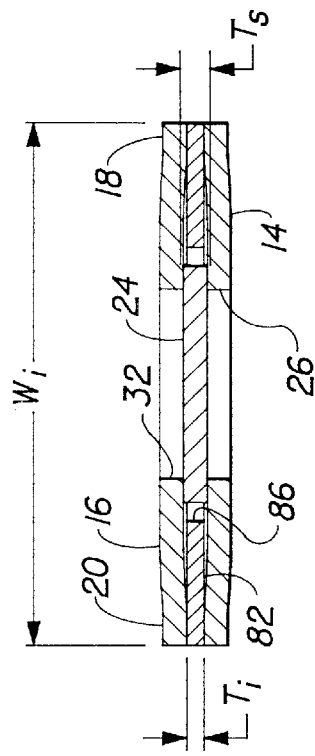
FIG. 7 is an enlarged cross-sectional view of the holder and inserted filmstrip of FIG. 6 as taken along line 7—7.

Referring to FIG. 3, there is illustrated a top plan view of the top sheet 16. Top sheet 16 is provided with a plurality of openings 32 which are sized, shaped and spaced apart so as to substantially correspond in position with respect to openings 26 such that when the top sheet is placed on the bottom sheet 14, openings 26,32 will be in substantial alignment. The openings 26,32 combine to provide a plurality of windows 34 when the sheets 14,16 are assembled to form the filmstrip holder 10 which is designed to align with the image areas 25 on filmstrip 24. The openings 32, like openings 26, have a leading edge 30 which is curved with respect to the direction of insertion of the strip 24 so as to minimize stubbing of the leading end 30 of filmstrip 24 as it is being inserted into the pocket 22. The windows 34 allow for direct exposure of the images on the filmstrip 24 in the apparatus which is to be used. In the preferred embodiment illustrated, the top and bottom sheets 14,16 are each provided with perforations 31,33 such that when the sheets 14,16 are assembled they form perforations 12.

The top and bottom sheets 14,16 are designed so to have substantially the same degree of flexibility and physical properties as the filmstrip designed to be used with the device such that the drive mechanism of the apparatus will experience no substantial difference between the holder and the film negative which it was originally designed to accommodate. Thus, it is important that the thickness and configuration of the holder 10 closely resembles the filmstrip negative for which the device is originally designed to be used. In the preferred embodiment illustrated, the sheets 14,16 are designed such that the overall thickness T is substantially equal to that of a conventional filmstrip and has the appropriate same degree of stiffness/flexibility of the filmstrip for which the device was originally designed to receive. In the particular embodiment illustrated, the bottom sheet 14 is made of Mylar material having a thickness $T_b$ of about 0.08 mm. The top sheet 16 is made of Mylar material and has a thickness $T_t$ of about 0.08 mm. The top and bottom sheets 14,16 may be secured together by any appropriate means. In the particular embodiment illustrated, an appropriate adhesive is used at the lateral edges 18,20. In the particular embodiment illustrated, pressure sensitive adhesive was used, however, other securing techniques may be used, for example, such as ultrasonic welding.

In the preferred embodiment illustrated, top sheet 16 is made of a clear plastic material and the bottom sheet 14 is provided with indicia 39 that may be picked up by an appropriate sensor which would indicate that a filmstrip holder having a smaller size film therein is being inserted into the apparatus. For example, as illustrated, indicia may comprise a machine readable bar-code placed on one of the lateral edges 20 of the bottom sheet 14. Such sensor additions and software modifications to the device can be made relatively simply as opposed to redesigning the transport mechanism for receiving small size film. Preferably, the device would be able to read the bar-code so that the device would know what size film was being scanned and make any appropriate adjustments as needed or programmed therein.

Also, in the preferred embodiment illustrated, means are also provided for locking the filmstrip 24 at a desired position within the pocket. In the particular embodiment illustrated, a pair of dimples 41, such as indentations or projections, are formed in the top and/or bottom sheets 14,16 which mate and lock with a corresponding indentation formed on the strip 24. In particular, this could take advantage of the existing perforation 46 that is provided in the filmstrip 24 in the space between adjacent images as is customarily done in the prior art as shown by FIG. 4.

As can be seen by reference to FIGS. 1, 2, 3 and 4, the top sheet 16 has a length $L_t$ which is less than the length $L_b$ of the bottom sheet 14. Thus, when the top sheet 16 is secured to the bottom sheet 14, the forward edge 38 of the top sheet 16 will lie over a portion of the bottom sheet 16. Preferably, as illustrated, the top sheet 16 will have a cut-away section 40 which defines the entrance to the pocket 22.

In order to more clearly understand the present invention, a brief description of its use will now be described. Referring to FIG. 5, there is illustrated the initial insertion of a filmstrip 24 (such as that illustrated in FIG. 4) into the opening 45 of the pocket 22. The filmstrip is simply slid in the longitudinal direction as illustrated by arrow 47. The lateral edges 44 of filmstrip 24 are clampingly held between the top and bottom sheets 14,16 in the pocket 22, as best seen by reference to FIG. 7. The edges of the pocket also serve to guide the filmstrip 24 as it is being slid into position. The strip 24 is inserted into the pocket 22 until the locking dimples 41 locks with the leading perforation 45 in strip 24. The holder 10 is of sufficient length L to accommodate the number of image areas typically found on the smaller filmstrip 24. Then the film holder 10 is simply placed into the device as any other filmstrip would be inserted. After use of the film has been completed, the filmstrip 24 is simply slipped out of pocket 22 and returned to the user in the appropriate format.

Figure 12:
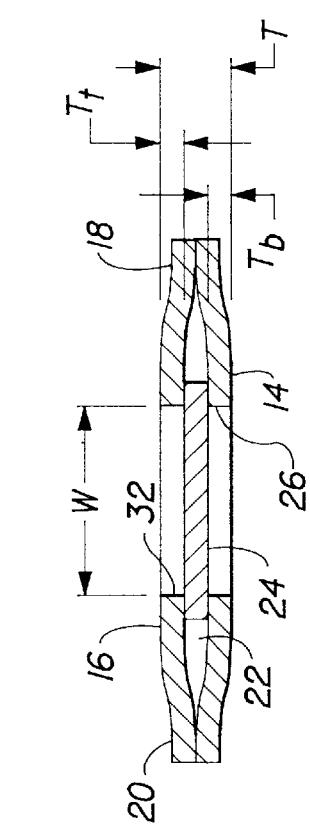
FIG. 12 is an enlarged cross-sectional view taken along line 12—12 of the filmstrip holder of FIG. 8 and the smaller size filmstrip disposed therein.
Figure 8:
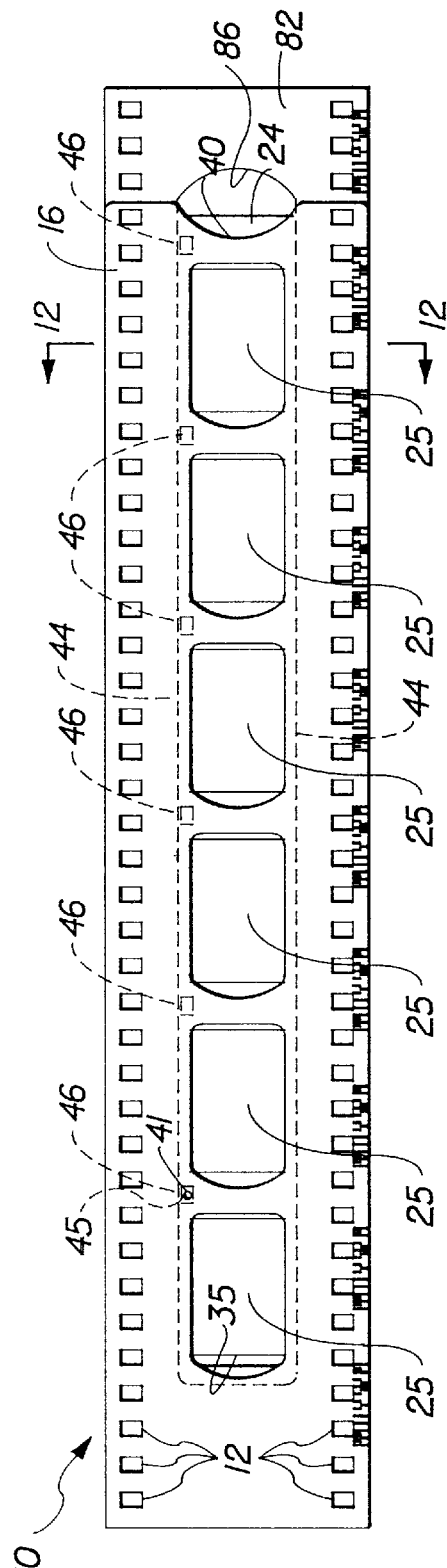
FIG. 8 is a top plan view of a modified film holder of a first format size made in accordance with the present invention for holding a filmstrip having a format size smaller than the first format size.
Figure 9:
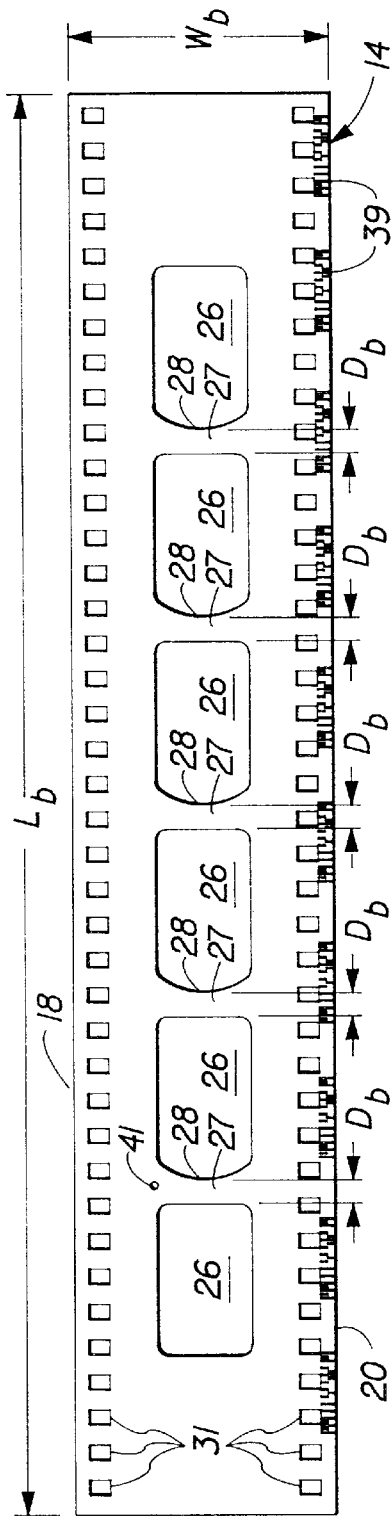
FIG. 9 is a top plan view of the bottom sheet of the film holder of FIG. 8.
Figure 10:
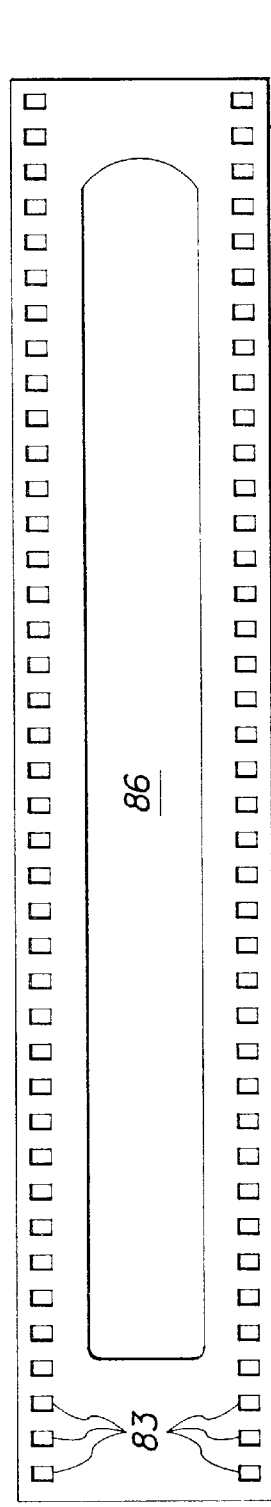
FIG. 10 is a top plan view of the intermediate layer of the filmstrip holder of FIG. 8.
Figure 11:
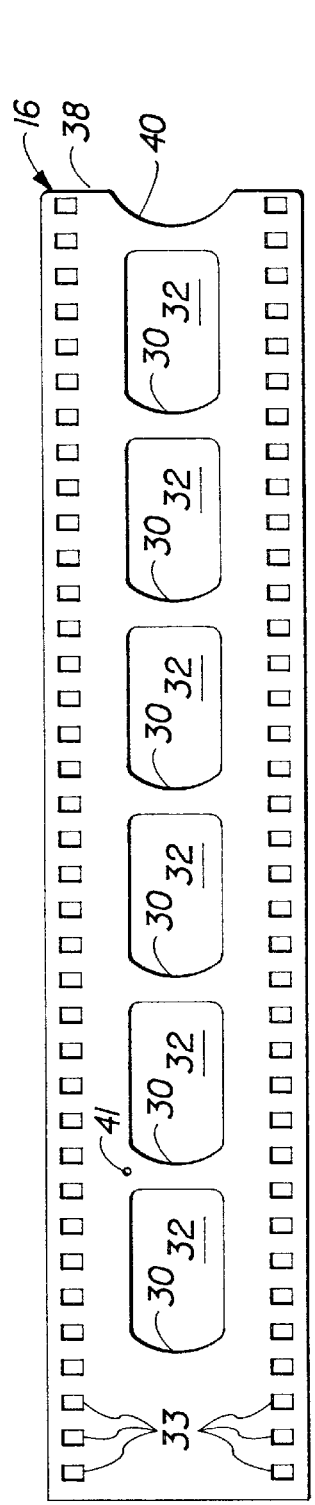
FIG. 11 is a top plan view of the top sheet of the filmstrip holder of FIG. 8.

Referring to FIGS. 8–12, there is illustrated a modified form of the present invention. In particular, there is illustrated a film holder 60. The film holder 60 is similar to film holder 10, like numerals indicating like parts. The film holder 60 includes a bottom sheet 14, a top sheet 16 and an intermediate sheet 82 (see FIG. 9). The use of an intermediate sheet 82 has a thickness $T_i$ which forms pocket 22 which has a substantially uniform thickness $T_s$ along its cross-sectional width as illustrated in FIG. 12. Preferably, the thickness $T_i$ of the pocket is slightly smaller than the thickness $T_s$ of the strip 24. The intermediate layer 82 has a width $W_i$ substantially equal to that of top and bottom sheets 14,16. The intermediate layer 82 is secured to the top and bottom sheets 14,16 by any appropriate means. In the particular embodiment illustrated, intermediate layer 82 is made of Mylar and secured to sheets 14,16 by an appropriate adhesive. The intermediate sheet 82 includes a long, continuous opening 86 which allows the filmstrip 24 to enter the pocket 22. The intermediate strip 82 is also provided with a plurality of perforations 83 at the lateral edges which are aligned with the appropriate perforations 31,33 provided in the top and bottom sheets 14,16 to form perforations 12. The operation and use of the film holder 60 is identical to that of filmstrip holder 10.

The present invention provides a film holder which is simple in construction, relatively inexpensive, and requires no substantial change or modification to the device in which it is to be used.

It is to be understood that various changes and modifications may be made without departing from the scope of the present invention. For example, but not by way of limitation, the perforations in the holder may be formed in the holder after the top, bottom and intermediate sheets are secured together. This would avoid the necessity of aligning these openings. Additionally the color of the sheets 14,16 and intermediate layer 82 may any color so desired. In the preferred embodiment illustrated, the top sheet 16 and intermediate layer 82 are substantially clear so the bar-code on the bottom sheet can be read. Yet further, the bar-code may be placed in the intermediate layer 82 or top sheet 16.

The present invention is limited only by the following claims:

Parts List

10 . . . filmstrip holder
12 . . . perforations
14 . . . bottom sheet

16 . . . top sheet
18,20 . . . lateral edges
22 . . . receiving pocket
24 . . . filmstrip
25 . . . images
26,32 . . . openings
27 . . . cross braces
28 . . . leading edges
30 . . . leading end
31,33 . . . perforations
34 . . . windows
38 . . . forward edge
39 . . . indicia
40 . . . cut-away section
41 . . . dimples
42 . . . indentations
44 . . . lateral edges
45 . . . leading perforation
46 . . . perforations
47 . . . arrow
60 . . . film holder
82 . . . intermediate sheet
83 . . . perforations
86 . . . continuous opening

What is claimed is:

1. A flexible film holder adapted to allow use of a filmstrip of a first size in a printing or scanning apparatus adapted to receive filmstrips of a second size greater than said first size, said flexible film holder comprising a first sheet member, a second sheet member secured to said first sheet member and form a pocket therebetween for receiving and holding said filmstrip of a first size, said pocket having an opening through which said filmstrip can be slid into and out of said pocket, and
means for locking said filmstrip in a predetermined position with respect to said holder.

2. A flexible film holder according to claim 1 further comprising means for guiding said filmstrip of said first size into said pocket.

3. A flexible film holder according to claim 2 wherein said means for guiding said filmstrip comprises the sides of said pocket bearing against the edges of said filmstrip so that said filmstrip can be inserted and guided in a first longitudinal direction.

4. A flexible film holder according to claim 1 wherein means for locking said filmstrip comprises at least one projection in said holder designed to engage a recess formed in said filmstrip.

5. A flexible film holder according to claim 1 wherein said pocket defines at least one window for allowing direct exposure of at least one image on said filmstrip.

6. A flexible film holder according to claim 5 wherein said window has a leading edge with respect to the direction of movement of said filmstrip when said filmstrip is being inserted into said pocket, said leading edge having a configuration designed to minimize catching of the leading edge of the filmstrip.

7. A flexible film holder according to claim 6 wherein said leading edge has a generally curved configuration with respect to the direction of insertion of the filmstrip into said holder.

8. A holder according to claim 5 wherein the window is designed to allow substantially full direct exposure of a single image on said filmstrip.

9. A flexible film flexible holder according to claim 1 wherein said pocket defines clamping means for retaining the edges of said filmstrip therebetween and allows sliding of the filmstrip in a first longitudinal direction.

10. A flexible filmstrip holder comprising:
a. a first sheet member;
b. a second sheet member secured to said first sheet member and forming an elongated pocket for receiving a filmstrip of a predetermined size, said pocket having a plurality of cross members defining windows through which direct exposure may be provided with regard to an image formed on said filmstrip, said pocket having an opening through which said filmstrip can be slid into and out of said pocket.

11. A flexible filmstrip according to claim 10 wherein said cross member has a leading edge which has a configuration designed to minimize catching of the leading end of the filmstrip as it is being inserted into said pocket.

12. A flexible film holder according to claim 10 further comprising means for guiding said filmstrip of said first size into said pocket.

13. A flexible film holder according to claim 12 wherein said means for guiding said filmstrip comprises the sides of said pocket bearing against the edges of said filmstrip so that said filmstrip can be inserted and guided in a first longitudinal direction.

14. A flexible film holder according to claim 10 further comprising means for locking said filmstrip in a predetermined position with respect to said holder.

15. A flexible film holder according to claim 14 wherein means for locking said filmstrip comprises at least one projection in said holder designed to engage a recess formed in said filmstrip.

16. A flexible film holder according to claim 15 wherein said windows are designed to allow substantially full direct exposure of a single image on said filmstrip.

17. A flexible film holder according to claim 10 wherein said plurality of windows are for allowing direct exposure of at least one image on said filmstrip.

18. A flexible film holder according to claim 17 wherein said plurality of windows each having a leading edge with respect to the direction of movement of said filmstrip when said filmstrip is being inserted into said pocket, said leading edge having a configuration designed to minimize catching of the leading end of the filmstrip.

19. A flexible holder according to claim 10 wherein said pocket defines means for retaining the clamping edges of said filmstrip therebetween and allows sliding of the filmstrip in a first longitudinal direction.

20. A flexible film holder according to claim 10 wherein said leading edge has a generally curved configuration with respect to the direction of insertion of the filmstrip into said holder.

21. A flexible film holder adapted to allow use of a filmstrip of a first size in a printing or scanning apparatus adapted to receive filmstrips of a second size greater than said first size, said flexible film holder comprising a first sheet member, a second sheet member and a third intermediate sheet member, said third intermediate sheet member being located between said first and second sheet members, said first, second and third member being secured together so as to form a pocket therebetween for receiving and holding said filmstrip of a first size, said pocket having an opening through which said filmstrip can be slid into and out of said pocket, and
means for locking said filmstrip in a predetermined position with respect to said holder.

22. A flexible film holder according to claim 21 further comprising means for guiding said filmstrip of said first size into said pocket.

23. A flexible film holder according to claim 22 wherein said means for guiding said filmstrip comprises the sides of said pocket bearing against the edges of said filmstrip so that said filmstrip can be inserted and guided in a first longitudinal direction.

24. A flexible film holder according to claim 21 wherein means for locking said filmstrip comprises at least one projection in said holder designed to engage a recess formed in said filmstrip.

25. A flexible film holder according to claim 21 wherein said pocket defines at least one window for allowing direct exposure of at least one image on said filmstrip.

26. A flexible film holder according to claim 25 wherein said window has a leading edge with respect to the direction of movement of said filmstrip when said filmstrip is being inserted into said pocket, said leading edge having a configuration designed to minimize catching of the leading end of the filmstrip.

27. A flexible film holder according to claim 26 wherein said leading edge has a generally curved configuration with respect to the direction of insertion of the filmstrip into said holder.

28. A flexible film holder according to claim 25 wherein the window is designed to allow substantially full direct exposure of a single image on said filmstrip.

29. A flexible film holder according to claim 21 wherein said pocket defines means for retaining the edges of said filmstrip therebetween and allows sliding of the filmstrip in a first longitudinal direction.

30. A flexible film holder adapted to allow use of a filmstrip of a first size in a printing or scanning apparatus adapted to receive filmstrips of a second size greater than said first size, said flexible film holder comprising a first sheet member, a second sheet member and a third intermediate sheet member, said third intermediate sheet member being located between said first and second sheet members, said first, second and third member being secured together so as to form a pocket therebetween for receiving and holding said filmstrip of a first size, said pocket having an opening through which said filmstrip can be slid into and out of said pocket, said intermediate sheet member has a thickness which is slightly less than the thickness of the filmstrip.

* * * * *